US006309066B1

(12) United States Patent
Kan

(10) Patent No.: US 6,309,066 B1
(45) Date of Patent: Oct. 30, 2001

(54) ASSEMBLED EYE-GLASSES

(76) Inventor: Kuo-Ying Kan, P.O. Box No. 6-57, Chung-Ho City, Taipei Hsien 235 (TW)

( * ) Notice: Subject to any disclaimer, the term of this patent is extended or adjusted under 35 U.S.C. 154(b) by 0 days.

(21) Appl. No.: 09/474,254

(22) Filed: Dec. 29, 1999

(51) Int. Cl.[7] .......................................... G02C 5/00
(52) U.S. Cl. ........................ 351/154; 351/104; 351/106
(58) Field of Search ............................ 351/41, 61, 103, 351/104, 106, 107, 109, 154, 178

(56) References Cited

U.S. PATENT DOCUMENTS 4,222,640 * 9/1980 Bononi .................................. 351/41
5,007,728 * 4/1991 Suzuki et al. .......................... 351/41

FOREIGN PATENT DOCUMENTS 4-75019 * 3/1992 (JP) ........................................ 351/41

* cited by examiner

*Primary Examiner*—Huy Mai

(57) ABSTRACT

"A manufacturing method of eye-glasses frame" disclosed in the invention among is formed by the assembling of a composite punch piece with the optical lens, in which the opening of the soft/hard composite punch piece is roughly pointed upward to hold the lens, and it can be bent in accord with the shape of the optical lens or into whatever shape the user likes to have, with the soft materials adopted in making the part of the punch piece near the eyelids to enhance the comfort of the users. As the upper edge of the lens is free from being held or covered, when the user is suffering from a considerable force of bumping, the part made by soft materials will absorb the force bumped against the part made by hard materials to diminish the injury caused to the face of the user, and the lens will fall off without causing injury to the eyes. The features of this invention in its capability of being bent in whatever way to suit the liking and the shape of face of individuals, and the changing of optical lens and moulding of the eye-glasses frame in a DIY manner along-with the attraction of its low cost and easy mode of manufacturing make it remarkably noted for its creativity and competitiveness.

6 Claims, 6 Drawing Sheets

ASSEMBLED EYE-GLASSES

BACKGROUND OF THE INVENTION (a) Field of the Invention

An assembled eyeglasses disclosed in the invention among is formed by the assembling of a composite punch piece with the optical lens, and the punch piece can be bent into whatever mould in accord with the shape of the optical lens or to the liking of individual users.

(b) Description of the Prior Art

The eyes are the windows of one's soul. To protect the eyes or to rectify the eye-sight which are bias, both the people in China and the overseas countries contributed much time and energy in the research of the design and manufacturing of eye-glasses. However, their manufacturing method is generally confined to either injection molding or casting (as illustrated in FIGS. 1 & 2). Due to the long time it would take in preparing the die for injection or casting and the necessity to have a set of die for making each and every style, it is really not economic to use when taking the time needed for development, the cost of the die and the casting.

What makes things worse is that, when a person who wears a pair of eyeglasses happened to fall on the ground, the broken pieces of the optical lens often unfortunately caused injury to the eyes of the user.

Therefore, if a design that can make a multiple changes of moulding with a framed piece in association with the optical lenses, it would reduce the cost of making the die, and also would meet the taste and preference of modem teenagers and youths in terms of buying. However, eye-glasses frame of such a design is not yet available in both domestic and overseas markets. In order to achieve this objective, this invention provides the manufacturing method of an eye-glasses frame, particularly denoting one shape of punched piece made of soft and hard composite materials capable of being bent to form different moulding and styles for the eye-glasses frame in association with various shapes of the optical lens, ultimately presenting an eye-glasses frame featured with creativity.

SUMMARY OF THE INVENTION

That is to say, the main objective of the present invention is to provide the manufacturing method of an eye-glasses frame made of composite soft and composite materials to cope with the different shapes of optical lens to hold the lens and form eye-glasses frames by means of bending.

Another objective of the present invention is to provide the manufacturing method of an eye-glasses frame without using any screw or glue.

A further objective of the present invention is to provide the manufacturing method of an eye-glasses frame, in which the elastic clamping and holding force of the edge of the frame itself is adopted in lieu of the traditional design of using two extension pieces with bending hooks hanging on the ears of the users to prevent the eye-glasses frames from falling off.

Another further objective of the present invention is to provide the manufacturing method of an eye-glasses frame, when the user is being violently bumped against and fall down onto the ground, and the bumping force the user received is beyond the holding and clamping force of the frame piece of the eyeglasses frame, the optical lens will fall off without causing any injury to the eyes of the user.

And yet another further objective of the present invention is to provide the manufacturing method of an eye-glasses frame, when the user is being bumped violently or falling down onto the ground, the part of the frame which is made of soft material will absorb the bumping force received by the part which is made of hard material to minimize the injury which might be caused to the face of the user.

A still further objective of the present invention is to provide the manufacturing method of an eye-glasses frame, of which the moulding can be designed and bent by individual users.

A final objective of the present invention is to provide the manufacturing method of an eye-glasses frame, in which it is so designed that various optical lenses can be changed by individual users.

BRIEF DESCRIPTION OF THE DRAWINGS

The other objectives and detailed drawings of the present invention will become clear with the presentation of the following descriptions. Please refer to the various drawings, so that a better understanding of the detailed contents of the present invention can be achieved:

Figure 1:
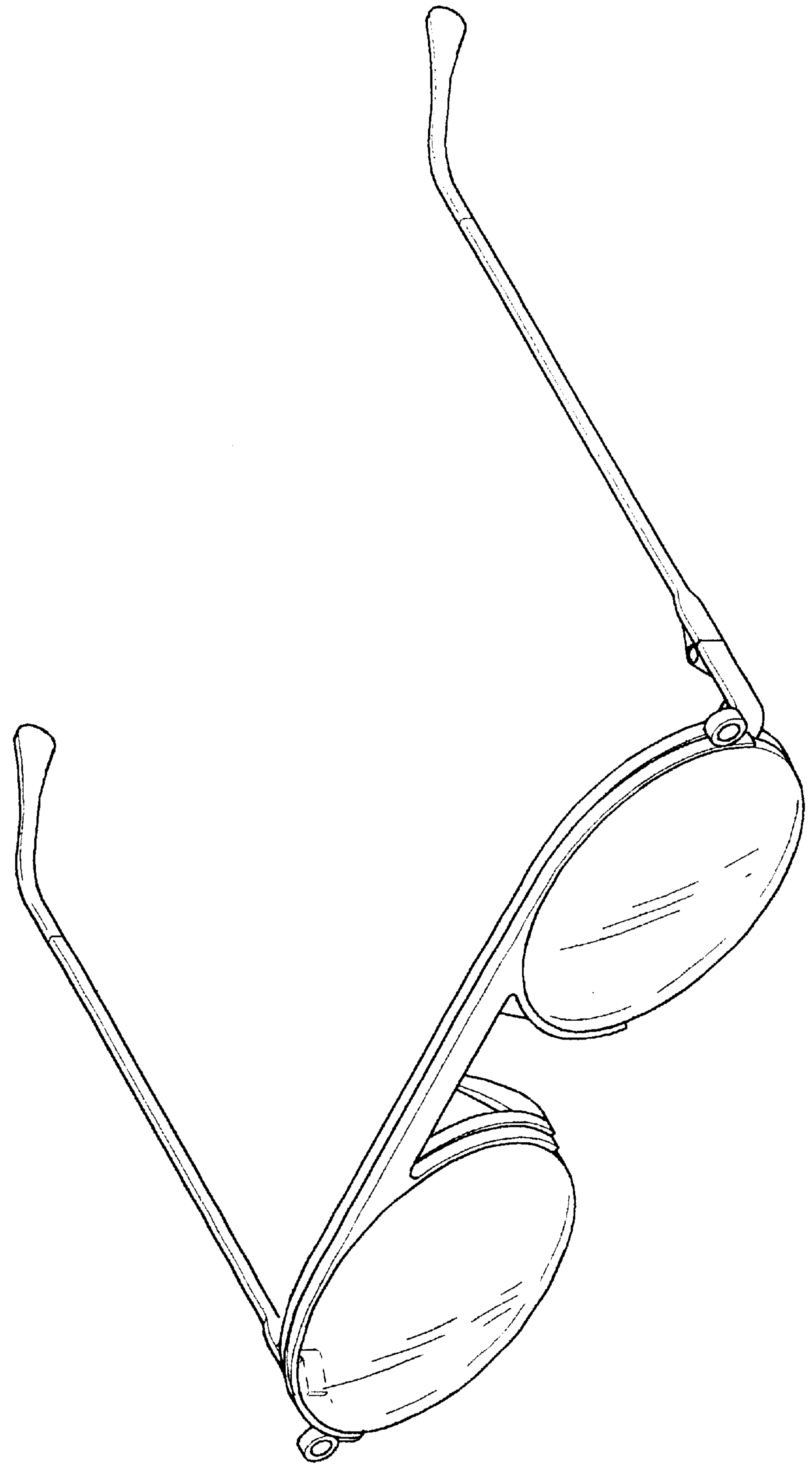

Description of Drawings:

FIG. 1 is a pictorial drawing of conventional eye-glasses.

Figure 2:
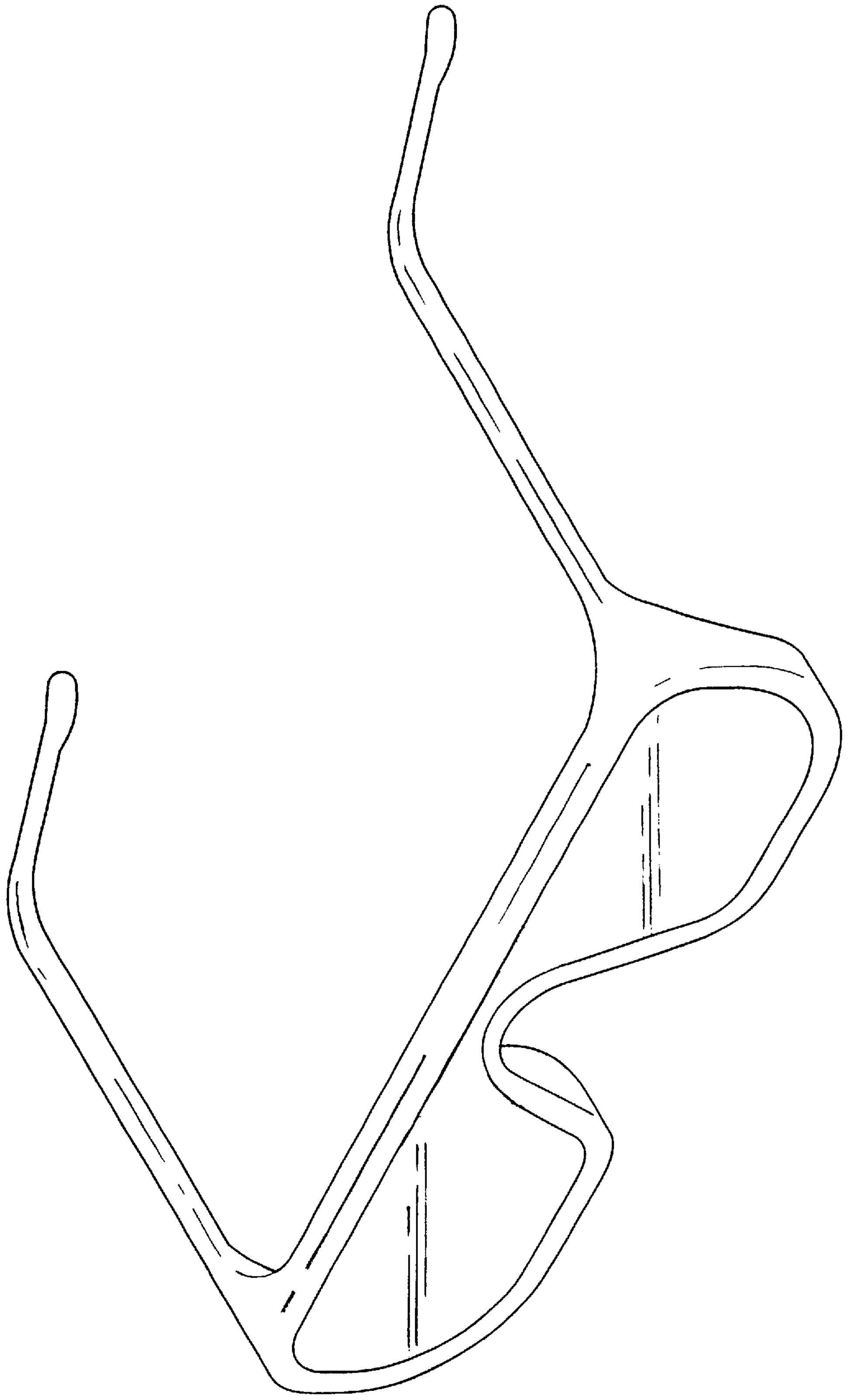

FIG. 2 is a pictorial drawing of another conventional eye-glasses.

Figure 3:
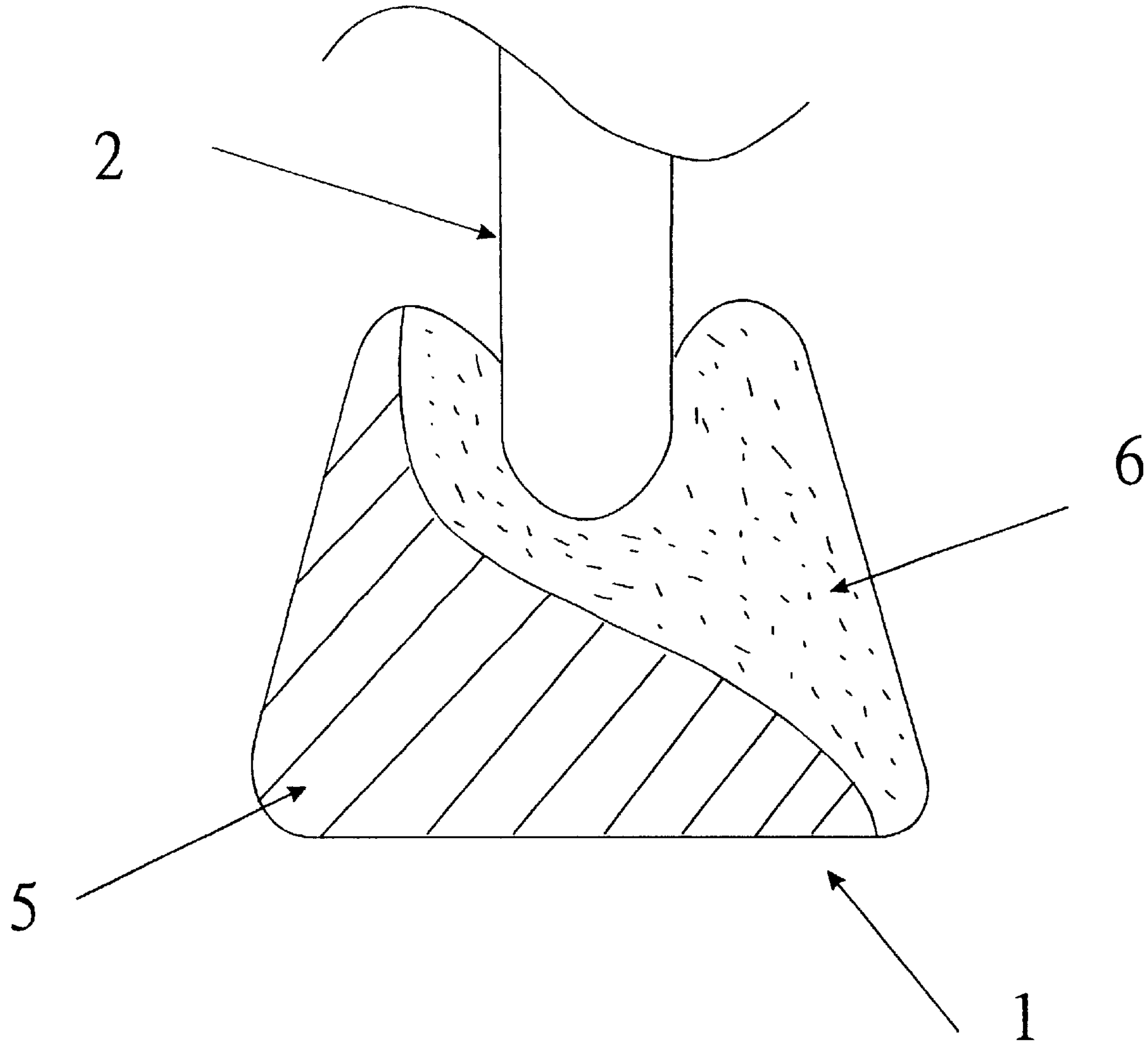

FIG. 3 is a cross-sectioned drawing of the present invention.

Figure 4:
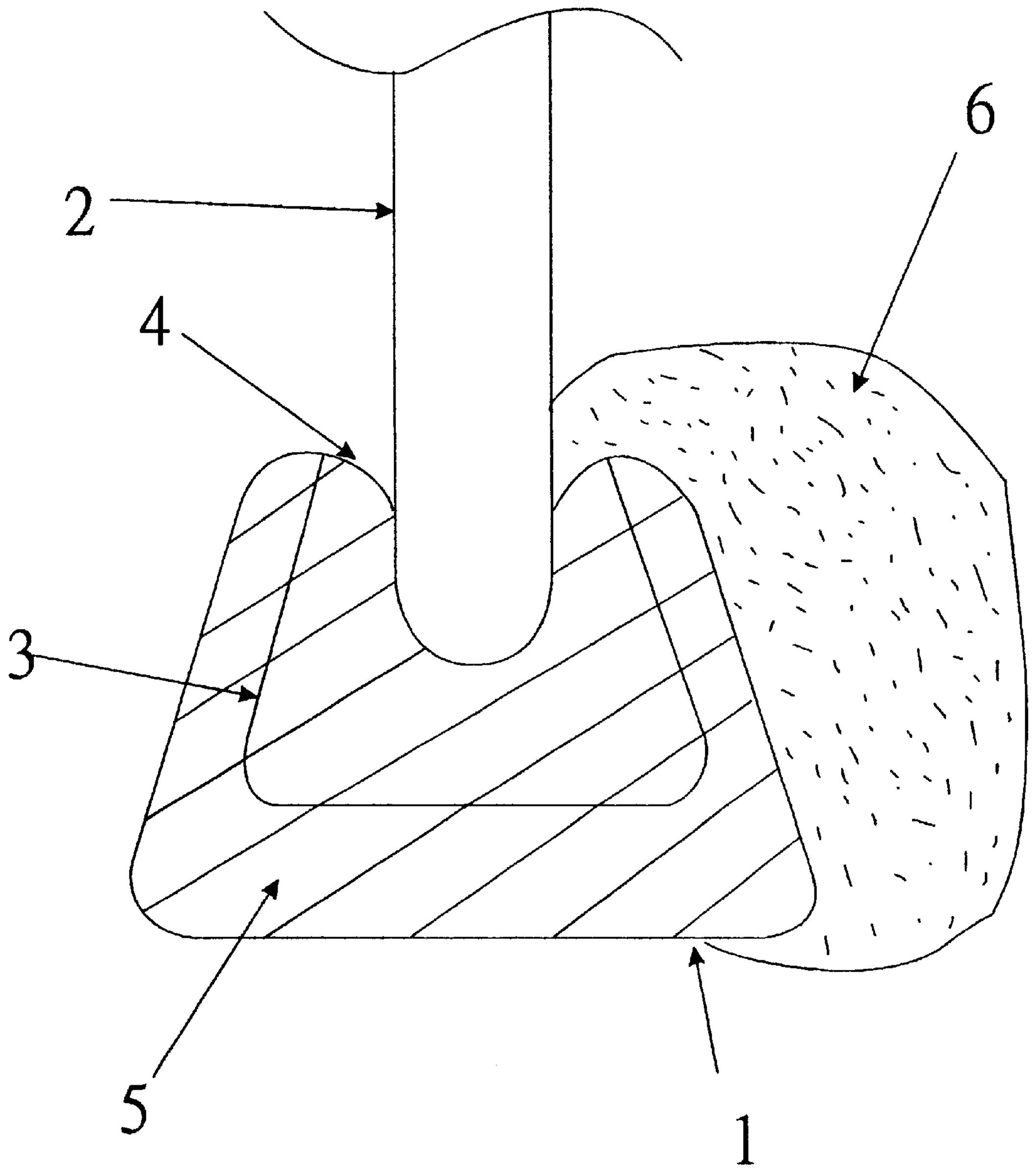

FIG. 4 is another cross-sectioned drawing of the present invention.

Figure 5:
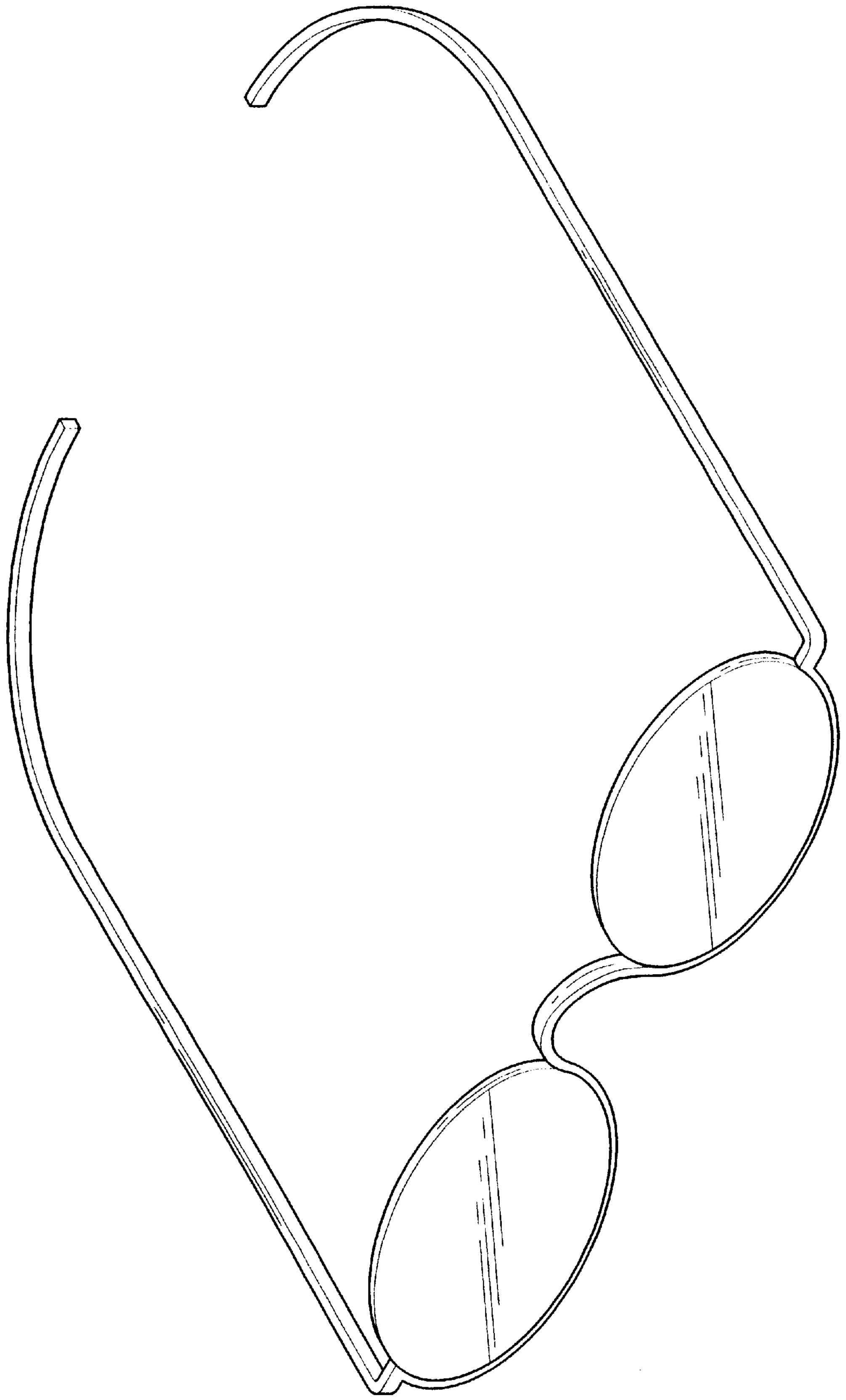

FIG. 5 is a preferred embodiment drawing of the present invention.

Figure 6A:
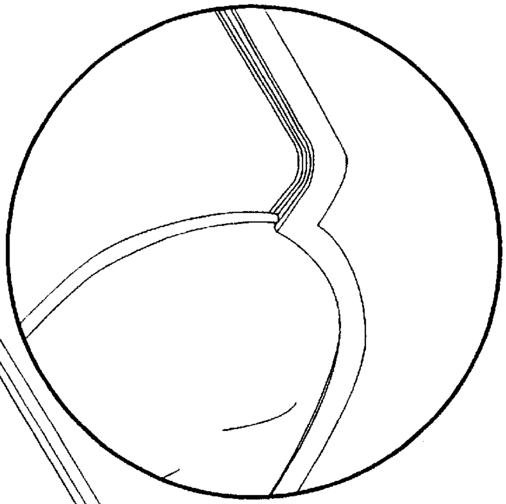
Figure 6:
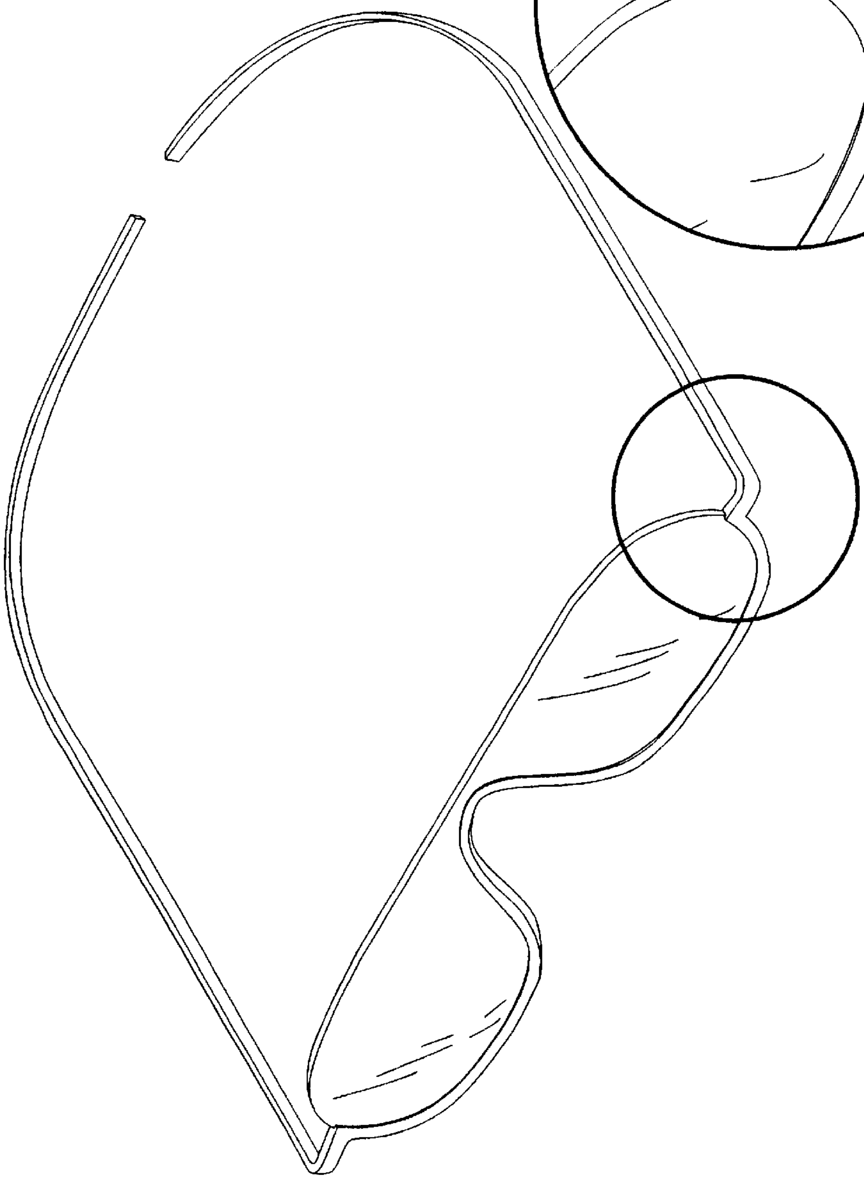

FIG. 6 is another preferred embodiment drawing of the present invention.

FIG. 6A is an enlarged view of area A in FIG. 6.

DESCRIPTION OF THE PREFERRED EMBODIMENT

As indicated by the attached drawings, the present invention is made by the assembling of a framed piece and 2 optical lenses, in which As indicated in FIG. 3, the opening of framed piece 1 is facing upward, and the holding opening 4 are holding optical lens 2.

As indicated in FIG. 4, framed piece 1 can be integrally formed by hard material 5 and soft material 6, and metallic foil 3 can also be wrapped in the middle of hard material 5; upon the manufacturing of the eye-glasses frame, put the part made by soft material close to the eyelids to make the users feel comfortable.

As indicated in FIG. 5, the illustration is an embodiment drawing of a single lens type of eye-glasses.

As indicated in FIG. 6 & FIG. 6A, the illustration is an embodiment drawing of a dual-lens type of eye-glasses.

Summarizing the above description, the present invention enabled simplification in the manufacturing method of eye-glasses frame, minimizing the cost of production, providing a rapid manufacturing process, and also presenting a means which can use the framed edge with a cross-sectioned moulding to cope with different optical lenses to make design for various eye-glasses frames. Its design is remarkably noted for its creativity which cannot be found in any conventional eye-glasses frames, no matter speaking in terms of its component parts, structure, method of manufacturing and effects. In addition, its capabilities to allow the users to change different lenses freely as they prefer (such as ordinary lens, short-sighted lens, lens for the aged, sunglasses lens . . . ) is something new to all users. In consideration of these features, therefore, a patent application is hereby filed with your patent office, for which your approval would be very much appreciated.

What is claimed is:

1. Eyeglasses comprising a composite punch piece in assembly with at least one optical lens, said composite punch piece including two extension pieces and a frame portion means forming an opening for holding said at least one optical lens, wherein said frame portion means having roughly facing upward means made of a soft material that can be bend or wound to match with at least a peripheral edge portion of said at least one optical lens whereby the optical lens is removable fixed in the opening without using glue or screw.

2. The eyeglasses as claimed in claim 1, wherein said composite punch piece is integrally formed by soft material and a bendable hard material.

3. The eyeglasses as claimed in claim 2, wherein said composite punch piece further including a metal sheet or foil wrapped in the interior of the bendable hard material.

4. The eyeglasses as claimed in claim 1, wherein the soft material can absorb a predetermined bumping force and hold the optical lens in the opening when a user is being bumped and fall down onto the ground.

5. The eyeglasses as claimed in claim 4, wherein when the bumping force excesses said predetermined bumping force, said optical lens will fall off to minimize the injury to the eye of the user.

6. The eyeglasses as claimed in claim 1, wherein the extension piece can be bent to form a clamping force to firmly hold the eyeglasses onto the head of the a user without touching the user's ears.

* * * * *